United States Patent
Jiang

(10) Patent No.: US 12,108,406 B2
(45) Date of Patent: Oct. 1, 2024

(54) REFERENCE SIGNAL TRANSMISSION METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 586 days.

(21) Appl. No.: 17/424,461

(22) PCT Filed: Jan. 23, 2019

(86) PCT No.: PCT/CN2019/072862
§ 371 (c)(1),
(2) Date: Jul. 20, 2021

(87) PCT Pub. No.: WO2020/150937
PCT Pub. Date: Jul. 30, 2020

(65) Prior Publication Data
US 2022/0078836 A1    Mar. 10, 2022

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC ...... H04W 28/16; H04W 72/23; H04L 5/0048
See application file for complete search history.

(56) References Cited

U.S. PATENT DOCUMENTS

| 10,064,064 | B2 | 8/2018 | Han et al. | |
| 2013/0163532 | A1* | 6/2013 | Anderson | H04L 5/0053 370/329 |
| 2013/0265916 | A1* | 10/2013 | Zhu | H04B 7/024 370/280 |
| 2013/0272263 | A1* | 10/2013 | Pi | H04L 25/0204 370/330 |
| 2015/0312010 | A1* | 10/2015 | Urabayashi | H04W 48/12 370/329 |

(Continued)

FOREIGN PATENT DOCUMENTS

| CN | 102858014 A | 1/2013 |
| CN | 106464351 A | 2/2017 |

(Continued)

OTHER PUBLICATIONS

International Search Report in the International Application No. PCT/CN2019/072862, mailed on Oct. 10, 2019, (2p).

(Continued)

*Primary Examiner* — Jenee Holland
(74) *Attorney, Agent, or Firm* — Arch & Lake LLP

(57) ABSTRACT

A reference signal transmission method and apparatus are provided. The method includes that a user equipment (UE) monitors dynamic scheduling information sent by a base station, where the dynamic scheduling information includes scheduling information of a reference symbol. Further, the UE determines, according to the dynamic scheduling information, the scheduling information of the reference symbol and receives, according to the scheduling information of the reference symbol, the reference symbol.

24 Claims, 9 Drawing Sheets

---

Monitor dynamic scheduling information sent by a base station, wherein the dynamic scheduling information includes scheduling information of at least one reference symbol — 101

Determine the scheduling information of the at least one reference symbol according to the dynamic scheduling information — 102

Receive the at least one reference symbol according to the scheduling information of the at least one reference symbol — 103

(56) References Cited

U.S. PATENT DOCUMENTS

| | | |
|---|---|---|
| 2015/0373674 A1 | 12/2015 | Han et al. |
| 2016/0105817 A1* | 4/2016 | Frenne ................. H04L 1/0026 370/252 |
| 2016/0142898 A1* | 5/2016 | Poitau ................... H04W 8/005 370/329 |
| 2017/0064558 A1 | 3/2017 | Li |
| 2017/0303144 A1 | 10/2017 | Guo et al. |
| 2017/0311311 A1* | 10/2017 | Frenne ................. H04W 76/27 |
| 2017/0338923 A1* | 11/2017 | Prasad ............. H04W 36/0085 |
| 2018/0062811 A1* | 3/2018 | Akkarakaran ........ H04L 5/0007 |
| 2018/0198548 A1* | 7/2018 | Nammi .............. H04L 27/2657 |
| 2018/0198579 A1* | 7/2018 | Nammi ............. H04L 27/26025 |
| 2018/0332508 A1* | 11/2018 | Axelsson ............. H04B 7/0695 |
| 2021/0226836 A1* | 7/2021 | Sahin ................. H04L 27/2636 |

FOREIGN PATENT DOCUMENTS

| | | |
|---|---|---|
| CN | 106686604 A | 5/2017 |
| CN | 107113913 A | 8/2017 |
| CN | 107135053 A | 9/2017 |
| CN | 108632006 A | 10/2018 |

OTHER PUBLICATIONS

English translation of the Written Opinion of the International Search Authority in the international application No. PCT/CN2019/072862, mailed on Oct. 10, 2019, (4p).

First Office Action of the Chinese Application No. 201980000170.0, issued on Oct. 26, 2021, with English translation, (22p).

International Search Report of PCT Application No. PCT/CN2019/072862 dated Oct. 10, 2019 with English translation (4p).

* cited by examiner

REFERENCE SIGNAL TRANSMISSION METHOD AND APPARATUS

This application is the U.S. national phase application of International Application No. PCT/CN2019/072862, filed on Jan. 23, 2019, the entire contents of which are incorporated herein by reference for all purposes.

TECHNICAL FIELD

The present disclosure relates to the field of communication technologies, and particularly, to a method and apparatus for transmitting reference signal.

BACKGROUND

The New Radio (NR) unlicensed band (NRU) technology in the 5G communication technology supports that NR operates in the unlicensed band. Since other radio access technologies, such as Wireless Fidelity (WiFi), may also use the unlicensed band, the coexistence and fairness between NRU and other radio access technologies on the use of the unlicensed band need to be achieved. The 5G NRU inherits the 5G NR technology in view of the coherence of the NR-U design and the 5G design. The 5G NRU adopts a Listen-before-talk (LBT) mechanism to ensure fairness on the use of the unlicensed band. LBT means that channel monitoring needs to be performed for a period of time before data is transmitted through a channel, and the transmission can be performed only when the channel is ensured to be idle. If the channel is occupied, information for a predetermined time cannot be transmitted.

The reference symbols, defined in 5G NR, used for Radio Link Monitoring (RLM) and Radio Resource Management (RRM) include a Discovery Reference Signal (DRS) and a Channel State Information-Reference Signal (CSI-RS). The RRM or RLM based on DRS is performed in a periodic window (DRS Measurement Timing Configuration (DMTC) window) configured by the network. The RLM or RRM based on CSI-RS is performed outside the DMTC window: Both the DRS and the CSI-RS are a reference symbol transmitted periodically. The DRS is transmitted in the DMTC window: The CSI-RS has its own transmission window:

SUMMARY

The present disclosure provide a method and apparatus for transmitting reference signal. The technical solutions are as follows.

According to a first aspect of embodiments of the present disclosure, a method for transmitting reference signal is provided. The method is applied to a user equipment (UE), and the method includes following operations.

The method includes that the UE monitors dynamic scheduling information sent by a base station, where the dynamic scheduling information includes scheduling information of at least one reference symbol.

Further, the method includes that the UE determines the scheduling information of the at least one reference symbol according to the dynamic scheduling information.

Moreover, the method includes that the UE receives the at least one reference symbol according to the scheduling information of the at least one reference symbol.

According to a second aspect of the present disclosure, a method for transmitting reference signal is provided. The method is applied to a base station, and the method includes following operations.

The method includes that the base station sends dynamic scheduling information a UE, where the dynamic scheduling information includes scheduling information of at least one reference symbol.

Further, the method includes that the base station sends the at least one reference symbol to the UE according to the scheduling information of the at least one reference symbol.

According to a third aspect of the embodiments of the present disclosure, a computer readable storage medium on which at least one instruction is stored is provided. The at least one instruction is loaded and executed by at least one processor to perform the operations performed in the method of the first aspect described above.

According to a fourth aspect of the present disclosure, a computer readable storage medium on which at least one instruction is stored is provided. The at least one instruction is loaded and executed by at least one processor to perform operations performed in the method of the second aspect described above.

It should be understood that the above general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. When the following description refers to the drawings, the same numbers in different drawings indicate the same or similar elements unless otherwise indicated. The embodiments described in the following exemplary embodiments do not represent all embodiments consistent with the present disclosure. Rather, they are merely examples of devices and methods consistent with aspects of the present disclosure as detailed in the appended claims.

In the prior art, when the DRS sent in the DMTC window cannot be sent due to LBT failure, UE cannot perform RLM, thereby possibly causing the UE to erroneously trigger a Radio Link Failure (RLF). Although the UE may recover from the RLF quickly to some extent by allowing the UE to perform the CSI-RS measurement outside the DMTC window; the CSI-RS is also sent based on the window; and a problem that the UE cannot perform the measurement due to the LBT failure may also occur, so that the UE cannot recover from the RLF quickly, the flexibility is poor, and the wireless measurement efficiency is low:

In order to solve the above problems, the embodiments of the present disclosure provide a method for transmitting reference signal. The method is applied to a UE, and includes the following operations. Dynamic scheduling information sent by a base station is monitored. The dynamic scheduling information includes scheduling information of at least one reference symbol. The scheduling information of the at least one reference symbol is determined according to the dynamic scheduling information. The at least one reference symbol is received according to the scheduling information of the at least one reference symbol. According to the method for transmitting reference signal provided in the embodiments of the present disclosure, the scheduling information of the reference symbol is sent to the UE by the base station in real time, so that the UE can receive the corresponding reference symbol in time according to an indication of the scheduling information of the reference symbol, and then perform wireless measurement according to the reference symbol, thereby avoiding a problem in the prior art that the reference signal sent in an DMTC window cannot be sent due to a LBT failure. The solution has high flexibility, and can increase an opportunity for the UE to perform wireless measurement, thereby improving wireless measurement efficiency.

It should be noted that the UE related in the embodiments of the present disclosure may include, for example, an electronic device such as a smartphone, a tablet computer, a desktop computer, a notebook computer, a drone, or a wearable device (such as a bracelet, smart glasses, or the like).

Based on the above analysis, the following specific examples are provided.

Figure 1:
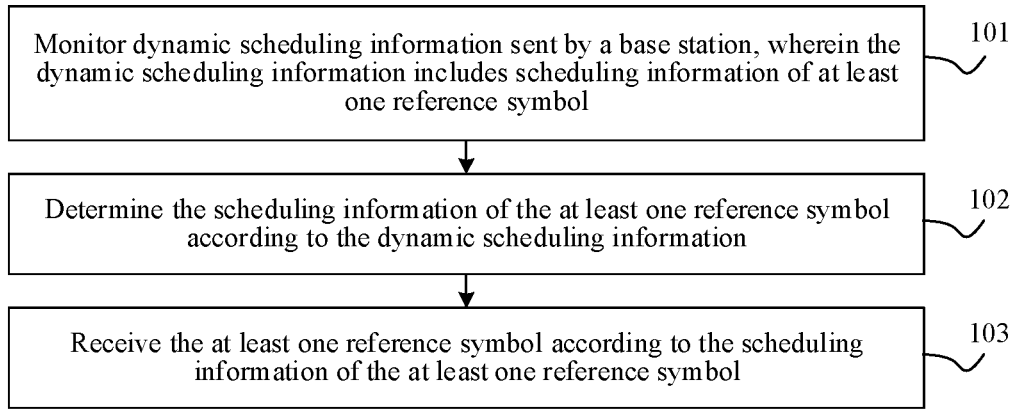
FIG. 1 is a flowchart of a method for transmitting reference signal according to an exemplary embodiment.

FIG. 1 is a flowchart of a method for transmitting reference signal according to an exemplary embodiment. The method for transmitting reference signal in the embodiments of the present disclosure may be executed by a UE. As shown in FIG. 1, the method includes the following steps 101-103.

In step 101, dynamic scheduling information sent by the base station is monitored. The dynamic scheduling information includes scheduling information of at least one reference symbol.

For example, the dynamic scheduling information includes any one or any combination of the following information: a reference symbol type, time-frequency resource location information of reference symbol, a time-frequency resource mapping manner of reference symbol, and a reference symbol density.

Alternatively, the reference symbol type includes any one or any combination of the following types: a DRS, a CSI-RS, a PSS, an SSS, and a PRS. Alternatively, different reference symbol types correspond to different RNTIs. The reference symbol type may be identified or indicated by the scheduled RNTI. It is assumed that the reference symbol type is A. The reference symbol type A is indirectly notified to the UE by transmitting the predetermined RNTI or identification information corresponding to the reference symbol type A in the dynamic scheduling information.

For example, when the DRS sent in the DMTC window cannot be sent due to LBT failure, the base station sends dynamic scheduling information to the UE. The dynamic scheduling information includes scheduling information of at least one reference symbol. Then the base station sends the at least one reference symbol to the UE according to the scheduling information of the at least one reference symbol. After monitoring the dynamic scheduling information sent by the base station, the UE receives the at least one reference symbol according to the scheduling information of the at least one reference symbol, and performs wireless measurement.

For example, when the base station determines that a duration of sending reference symbol unsuccessfully is greater than a preset duration, or consecutive times of sending reference symbol unsuccessfully are greater than preset times, the dynamic scheduling information is sent by the base station to the UE, so that an opportunity for the UE to successfully perform the wireless measurement can be increased. Accordingly, when a duration of no reference symbol being detected by the UE is greater than a preset duration, or when consecutive times of no reference symbol being detected are greater than preset times, the dynamic scheduling information is monitored by the UE, so that the times of invalid monitoring performed by UE can be reduced.

For example, the base station sends indication information to the UE before sending the dynamic scheduling information to the UE. The indication information is used for indicating whether the UE starts monitoring the dynamic scheduling information. The UE monitors the indication information sent by the base station, and determines whether to start monitoring the dynamic scheduling information according to the indication information, so that excessive power consumption caused by monitoring continuously by UE is avoided.

For example, the UE may send capability information to the base station in advance. The capability information is used for indicating whether the UE supports monitoring the dynamic scheduling information. After receiving the capability information sent by the UE, if the base station learns, according to the capability information, that the UE supports monitoring the dynamic scheduling information, when the DRS sent in the DMTC window cannot be sent due to LBT failure, the base station sends the dynamic scheduling information to the UE to instruct the UE to receive reference symbol according to the scheduling information of the reference symbol, which can prevent the base station from sending the dynamic scheduling information to the UE that does not support monitoring the dynamic scheduling information, thereby improving message sending efficiency.

In step 102, the scheduling information of the at least one reference symbol is determined according to the dynamic scheduling information.

For example, all scheduling information of reference symbol may be included in the dynamic scheduling information. Only a part of scheduling information of reference symbol also may be included in the dynamic scheduling information, and the remaining scheduling information of the reference symbol is sent by the base station to the UE in advance.

In step 103, the at least one reference symbol is received according to the scheduling information of the at least one reference symbol.

For example, after monitoring the dynamic scheduling information sent by the base station, the UE receives the reference symbol according to the scheduling information of the reference symbol, and then performs wireless measurement, so that the UE can quickly recover from the RLF.

According to the technical solution provided in the embodiments of the present disclosure, the scheduling information of reference symbol is sent to the UE by the base station in real time, so that the UE can receive the corresponding reference symbol in time according to an indication of the scheduling information of the reference symbol, and then perform wireless measurement according to the reference symbol, thereby avoiding a problem in the prior art that the reference signal sent in a DMTC window cannot be sent due to LBT failure. The solution has high flexibility, and can increase an opportunity for the UE to perform wireless measurement, thereby improving wireless measurement efficiency.

Figure 2:
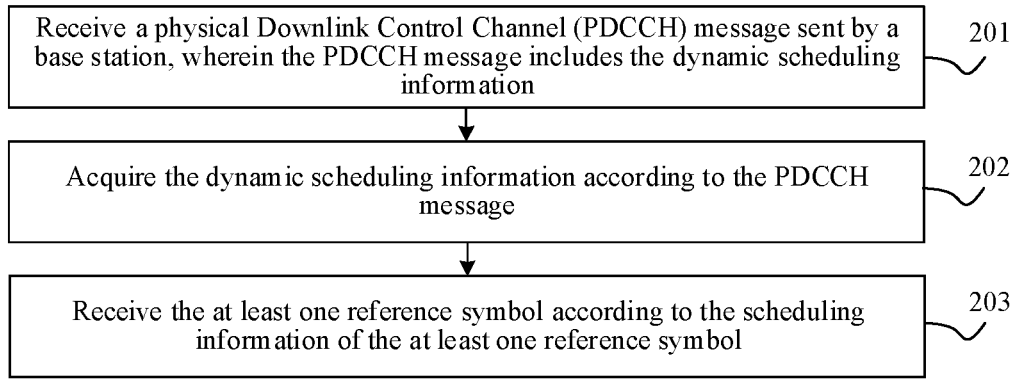
FIG. 2 is a flowchart of a method for transmitting reference signal according to an exemplary embodiment.

FIG. 2 is a flowchart of a method for transmitting a reference signal according to an exemplary embodiment. The method for transmitting a reference signal in the embodiments of the present disclosure may be performed by a UE, and the method shown in FIG. 2 includes the following steps 201-203, in which parts that are not described in detail in the present embodiment may refer to the corresponding description of the embodiment of FIG. 1.

In step 201, a PDCCH message sent by a base station is received. The PDCCH message includes the dynamic scheduling information.

For example, the PDCCH message may further include a target RNTI used for instructing the UE to receive the at least one reference symbol according to the scheduling information of the at least one reference symbol.

For example, the PDCCH message may further include Physical Downlink Shared Channel (PDSCH) scheduling information. That is, the dynamic scheduling information and the PDSCH scheduling information may be multiplexed in one PDCCH, so that resource utilization efficiency can be improved.

In step 202, the dynamic scheduling information is acquired according to the PDCCH message.

In step 203, the at least one reference symbol is received according to the scheduling information of the at least one reference symbol.

According to the technical solution provided in the embodiments of the present disclosure, the base station sends the scheduling information of reference symbol to the UE in real time in a manner that the PDCCH message carries the dynamic scheduling information, so as to simplify the implement of solution, so that the UE can receive the corresponding reference symbol in time according to the indication of the scheduling information of the reference symbol, and then perform the wireless measurement according to the reference symbol. The solution has high flexibility and can increase an opportunity for the UE to perform wireless measurement.

Figure 3:
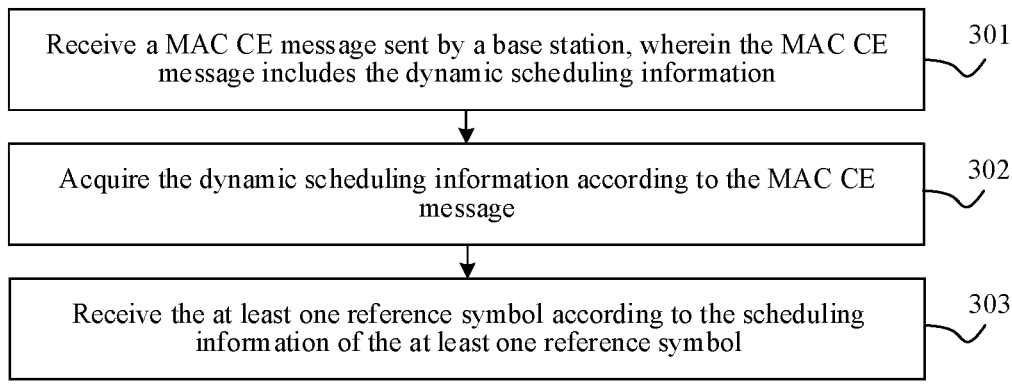
FIG. 3 is a flowchart of a method for transmitting reference signal according to an exemplary embodiment.

FIG. 3 is a flowchart of a method for transmitting reference signal according to an exemplary embodiment. The method for transmitting reference signal in the embodiments of the present disclosure may be performed by a UE, and the method shown in FIG. 3 includes the following steps 301-303, in which parts that are not described in detail in the present embodiment may refer to the corresponding description of the embodiment of FIG. 1.

In step 301, a MAC CE message sent by a base station is received. The MAC CE message includes the dynamic scheduling information.

In step 302, dynamic scheduling information is acquired according to the MAC CE message.

In step 303, the at least one reference symbol is received according to the scheduling information of the at least one reference symbol.

According to the technical solution provided in the embodiments of the present disclosure, the base station sends the scheduling information of reference symbol to the UE in real time in a manner that the MAC CE message carries the dynamic scheduling information, so as to simplify the implement of solution, so that the UE can receive the corresponding reference symbol in time according to the indication of the scheduling information of reference symbol, and then perform the wireless measurement according to the reference symbol. The solution has high flexibility and can increase the opportunity for the UE to perform the wireless measurement.

Figure 4:
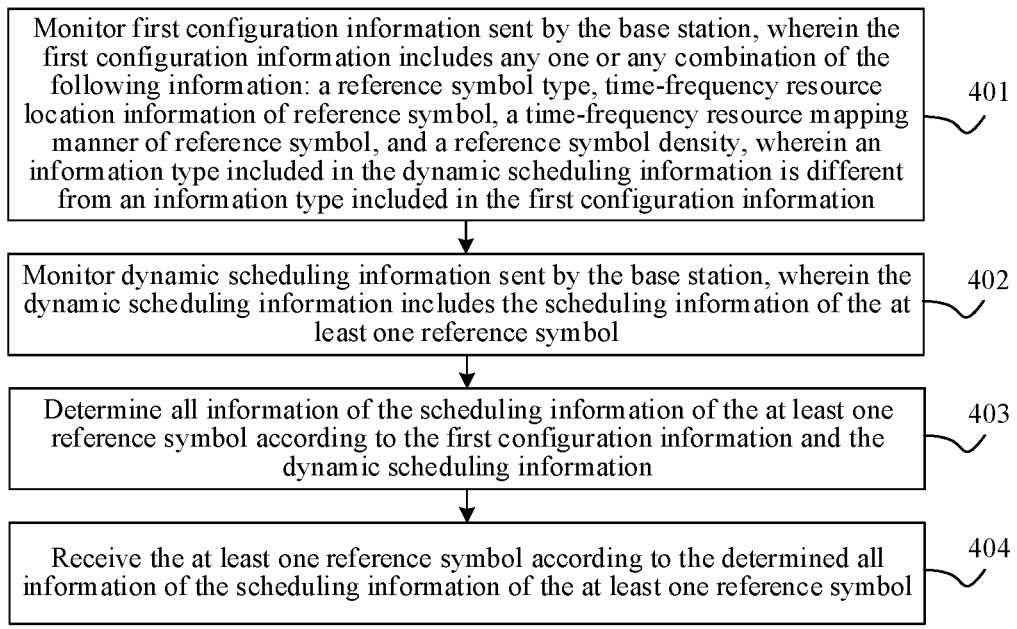
FIG. 4 is a flowchart of a method for transmitting reference signal according to an exemplary embodiment.

FIG. 4 is a flowchart of a method for transmitting reference signal according to an exemplary embodiment. The method for transmitting reference signal in the embodiments of the present disclosure may be performed by a UE. The method shown in FIG. 4 includes the following steps 401-404, in which parts that are not described in detail in the present embodiment may refer to the corresponding description of the embodiment of FIG. 1.

In step 401, first configuration information sent by the base station is monitored. The first configuration information includes any one or any combination of the following information: a reference symbol type, time-frequency resource location information of reference symbol, a time-frequency resource mapping manner of reference symbol, and a reference symbol density: An information type included in the dynamic scheduling information is different from an information type included in the first configuration information.

In step 402, the dynamic scheduling information sent by the base station is monitored. The dynamic scheduling information includes the scheduling information of the at least one reference symbol.

For example, the dynamic scheduling information includes any one or any combination of the following: a reference symbol type, time-frequency resource location information of reference symbol, a time-frequency resource mapping manner of reference symbol, and a reference symbol density.

It should be noted that the UE may determine all information of the scheduling information of the reference symbol according to the first configuration information and the dynamic scheduling information.

In step 403, all information of the scheduling information of the at least one reference symbol is determined according to the first configuration information and the dynamic scheduling information.

In step 404, the at least one reference symbol is received according to the determined all information of the scheduling information of the at least one reference symbol.

It is assumed that all information of the scheduling information of the reference symbol includes four types: a reference symbol type, time-frequency resource location information of reference symbol, a time-frequency resource mapping manner of reference symbol, and a reference symbol density: Two examples are described as follows.

In example 1), the four types of information are divided into two groups of information. A reference symbol type and a reference symbol density are included in the first group of information. Time-frequency resource location information of reference symbol and a time-frequency resource mapping manner of reference symbol are included in the second group of information.

The first configuration information sent by the base station to the UE in step 401 includes the first group of information, i.e. a reference symbol type and a reference symbol density.

The dynamic scheduling information sent by the base station to the UE in step 402 includes the second group of information, i.e. time-frequency resource location information of reference symbol and a time-frequency resource mapping manner of reference symbol.

The UE may then determine all information of the scheduling information of reference symbol according to the first group of information and the second group of information.

In example 2), the above four types of information are divided into two groups of information. A reference symbol type is included in information group (a). A reference symbol density, time-frequency resource location information of reference symbol, and a time-frequency resource mapping manner of reference symbol are included in information group (b).

The first configuration information sent by the base station to the UE in step 401 includes the information group (a), i.e. a reference symbol type.

The dynamic scheduling information sent by the base station to the UE in step 402 includes the information group (b), i.e. a reference symbol density, time-frequency resource location information of reference symbol, and a time-frequency resource mapping manner of reference symbol.

Then, the UE may determine all information of scheduling information of a reference symbol according to the information group (a) and the information group (b).

There may be other grouping manner, which are not specifically limited in the present embodiment.

According to the technical solution provided in the embodiments of the present disclosure, the base station sends part scheduling information of a reference symbol to the UE in advance in a manner in which the first configuration information is sent to the UE firstly, and sends the remaining scheduling information of reference symbol to the UE in real time, thereby reducing the signaling load of the dynamic scheduling information, simplifying the solution, and improving the flexibility of the solution. Which scheduling information is sent firstly and which scheduling information is sent later may be determined according to the actual use scenario, which is not specifically limited in the present embodiments.

Figure 5:
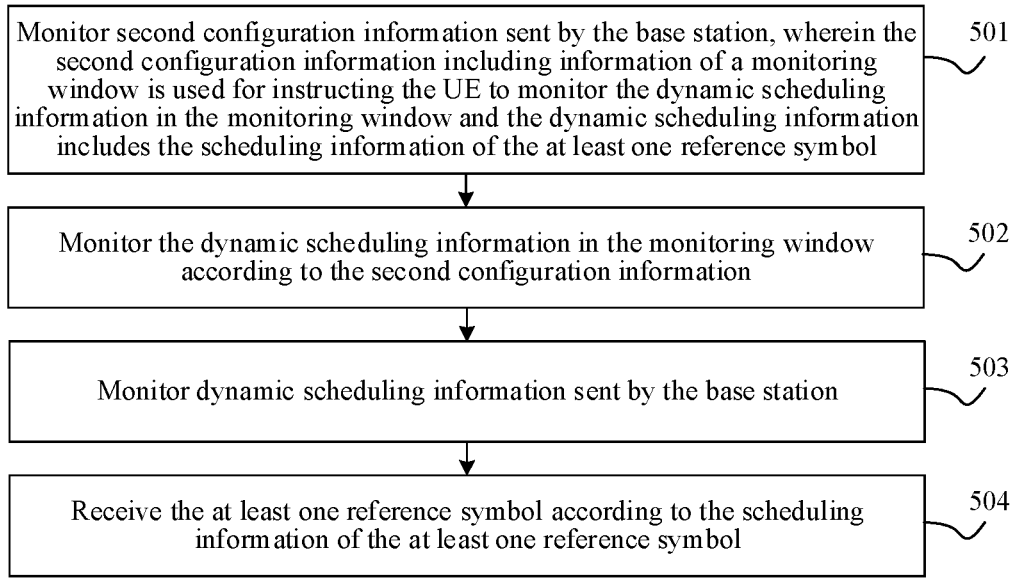
FIG. 5 is a flowchart of a method for transmitting reference signal according to an exemplary embodiment.

FIG. 5 is a flowchart of a method for transmitting reference signal according to an exemplary embodiment. The method for transmitting reference signal in the embodiments of the present disclosure may be performed by a UE, and the method shown in FIG. 5 includes the following steps 501-504, in which parts that are not described in detail in the present embodiment may refer to the corresponding description of the embodiment of FIG. 1.

In step 501, the second configuration information sent by the base station is monitored. The second configuration information including information of a monitoring window is used to instruct the UE to monitor the dynamic scheduling information in the monitoring window: The dynamic scheduling information includes the scheduling information of the at least one reference symbol.

In step 502, the dynamic scheduling information is monitored in the monitoring window according to the second configuration information.

Alternatively, the base station monitors the dynamic scheduling information sent to the UE at a paging moment. Accordingly, the UE monitors the dynamic scheduling information sent by the base station at the paging moment. The solution is implemented simply and other physical channel resources are not occupied.

In step 503, the dynamic scheduling information sent by the base station is monitored.

In step 504, the at least one reference symbol is received according to scheduling information of the at least one reference symbol.

According to the technical solution provided in the embodiments of the present disclosure, the base station sends the information of the monitoring window to the UE in advance in a manner in which the second configuration information is sent to the UE firstly, and instructs the UE to monitor the dynamic scheduling information in the monitoring window; so that excessive power consumption caused by monitoring continuously by UE is avoided.

Figure 6:
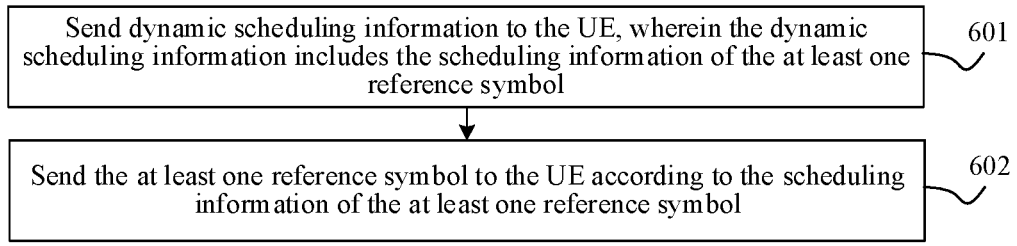
FIG. 6 is a flowchart of a method for transmitting reference signal according to an exemplary embodiment.

FIG. 6 is a flowchart of a method for transmitting reference signal according to an exemplary embodiment. The method for transmitting reference signal in the embodiments of the present disclosure may be performed by a base station. The method shown in FIG. 6 includes the following steps 601-602, in which parts that are not described in detail in the present embodiment may refer to the corresponding description of the embodiment of FIG. 1.

In step 601, dynamic scheduling information is sent to the UE. The dynamic scheduling information includes the scheduling information of the at least one reference symbol.

In step 602, the reference symbol is sent to the UE according to the scheduling information of the at least one reference symbol.

According to the technical solution provided in the embodiments of the present disclosure, a base station sends the scheduling information of reference symbol to a UE in real time, so that the UE can receive the corresponding reference symbol in time according to an indication of the scheduling information of the reference symbol, and then perform wireless measurement according to the reference symbol, thereby avoiding a problem in the prior art that a reference signal sent in a DMTC window cannot be sent due to LBT failure. The solution has high flexibility, and can increase an opportunity for the UE to perform wireless measurement, thereby improving wireless measurement efficiency.

In one embodiment, the operation that the dynamic scheduling information is sent to the UE in step 601 includes the following operation. A PDCCH message is sent to the UE. The PDCCH message includes dynamic scheduling information.

In one embodiment, the PDCCH message further includes a target RNTI used for instructing the UE to receive the at least one reference symbol according to the scheduling information of the at least one reference symbol.

In one embodiment, the operation that the dynamic scheduling information is sent to the UE in step 601 includes the following operation. A MAC CE message is sent to the UE. The MAC CE message includes the dynamic scheduling information.

In one embodiment, the PDCCH message further includes PDSCH scheduling information.

In one embodiment, the dynamic scheduling information includes any one or any combination of the following information: a reference symbol type, time-frequency resource location information of reference symbol, and a time-frequency resource mapping manner of reference symbol.

In one embodiment, the reference symbol type includes any one or any combination of the following types: a DRS, a CSI-RS, a PSS, a SSS, and a PRS.

In one embodiment, different reference symbol types correspond to different RNTIs.

In one embodiment, before sending the dynamic scheduling information to the UE, the method further includes the following operation. The first configuration information is sent to the UE. The first configuration information includes any one or any combination of the following information: a reference symbol type, time-frequency resource location information of reference symbol, a time-frequency resource mapping manner of reference symbol, and a reference symbol density: An information type included in the dynamic scheduling information is different from an information type included in the first configuration information.

In one embodiment, before sending the dynamic scheduling information to the UE, the method further includes the following operation. Indication information is sent to the UE. The indication information is used for indicating whether the UE starts monitoring the dynamic scheduling information.

In one embodiment, before sending the dynamic scheduling information to the UE, the method further includes the following operation. Second configuration information is sent to the UE. The second configuration information including information of a monitoring window is used for instructing the UE to monitor the dynamic scheduling information in the monitoring window: The operation that the dynamic scheduling information is sent to the UE includes the following operation. The dynamic scheduling information is sent to the UE in the monitoring window:

In one embodiment, the operation that the dynamic scheduling information is sent to the UE in step 601 includes the following operation. When a duration of sending reference symbol unsuccessfully is greater than a preset duration, or when consecutive times of sending reference symbol unsuccessfully are greater than preset times, the dynamic scheduling information is sent to the UE.

In one embodiment, before sending the dynamic scheduling information to the UE, the method further includes the following operation. Capability information sent by the UE is received. The capability information is used for indicating whether the UE supports monitoring the dynamic scheduling information. The operation that the dynamic scheduling information is sent to the UE includes the following operation. When learning, according to the capability information, that the UE supports monitoring the dynamic scheduling information, the dynamic scheduling information is sent to the UE.

In one embodiment, the operation that the dynamic scheduling information is sent to the UE in step 601 includes the following operation. The dynamic scheduling information is sent to the UE at a paging moment.

Figure 7:
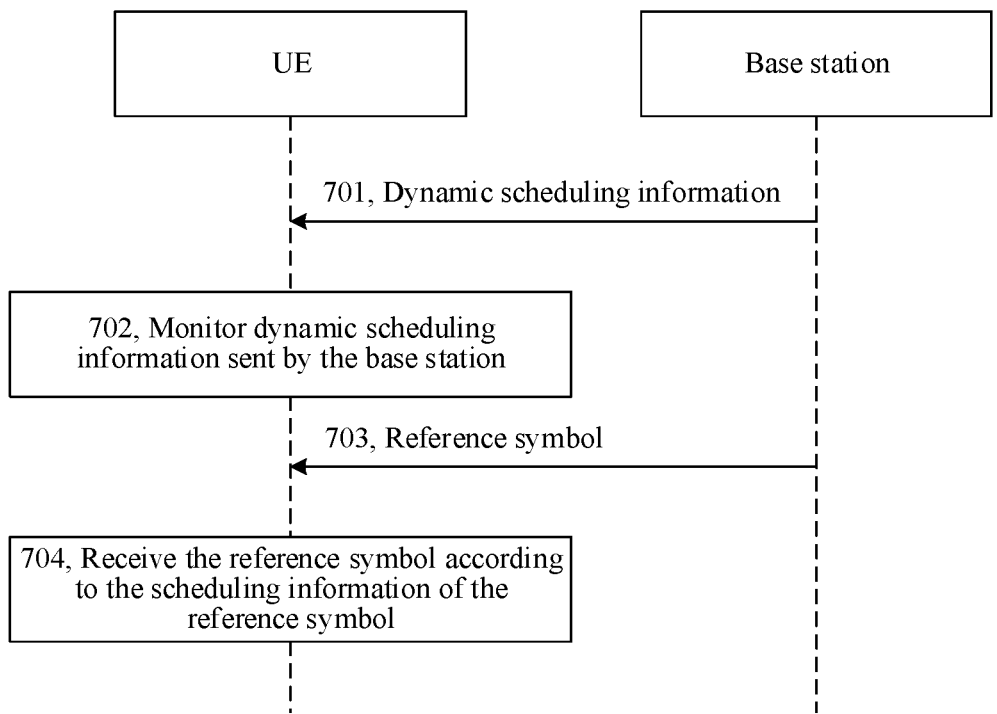
FIG. 7 is a flowchart of a method for transmitting reference signal according to an exemplary embodiment.

FIG. 7 is a flowchart of a method for transmitting reference signal according to an exemplary embodiment. The method for transmitting reference signal in the embodiment of present disclosure is performed by a base station and a UE in cooperation, and the method shown in FIG. 7 includes the following steps 701-704, in which parts that are not described in detail in the present embodiment may refer to the corresponding description of the embodiment of FIG. 1.

In step 701, the base station sends the dynamic scheduling information to the UE. The dynamic scheduling information includes scheduling information of at least one reference symbol.

In step 702, the UE monitors the dynamic scheduling information sent by the base station.

In step 703, the base station sends the at least one reference symbol to the UE according to the scheduling information of the at least one reference symbol.

In step 704, the UE receives the at least one reference symbol according to the scheduling information of the at least one reference symbol.

According to the technical solution provided in the embodiments of the present disclosure, the scheduling information of reference symbol is sent to a UE by a base station in real time, so that the UE can receive corresponding reference symbol in time according to an indication of the scheduling information of the reference symbol, and then perform wireless measurement according to the reference symbol, thereby avoiding a problem in the prior art that the reference signal sent in an DMTC window cannot be sent due to LBT failure. The solution has high flexibility, and can increase an opportunity for the UE to perform wireless measurement, thereby improving wireless measurement efficiency.

The following is apparatus embodiments of the present disclosure. The apparatus may be used to perform the method embodiments of the present disclosure. The parts not described in detail in the apparatus embodiments may refer to the method embodiments.

Figure 8:
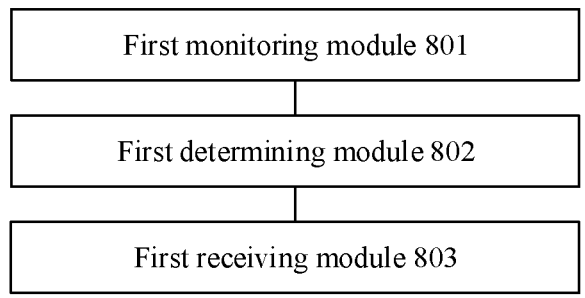
FIG. 8 is a block diagram of an apparatus for transmitting reference signal according to an exemplary embodiment.

FIG. 8 is a block diagram of an apparatus for transmitting reference signal according to an exemplary embodiment. The apparatus may be implemented in various ways, such as implementing all components of the apparatus in a UE, or implementing components in the apparatus in a coupled manner at the UE side. Referring to FIG. 8, the apparatus for transmitting reference signal includes a first monitoring module 801, a first determining module 802, and a first receiving module 803.

The first monitoring module 801 is configured to monitor dynamic scheduling information sent by a base station. The dynamic scheduling information includes scheduling information of at least one reference symbol.

The first determining module 802 is configured to determine the scheduling information of the at least one reference symbol according to the dynamic scheduling information.

The first receiving module 803 is configured to receive the at least one reference symbol according to the scheduling information of the at least one reference symbol monitored by the first monitoring module 801.

According to the technical solution provided in the embodiments of the present disclosure, the scheduling information of reference symbol is sent to a UE by a base station in real time, so that the UE can receive corresponding reference symbol in time according to an indication of the scheduling information of reference symbol, and then perform wireless measurement according to reference symbol, thereby avoiding a problem in the prior art that a reference signal sent in a DMTC window cannot be sent due to LBT failure. The solution has high flexibility, and can increase an opportunity for the UE to perform wireless measurement, thereby improving wireless measurement efficiency.

Figure 9:
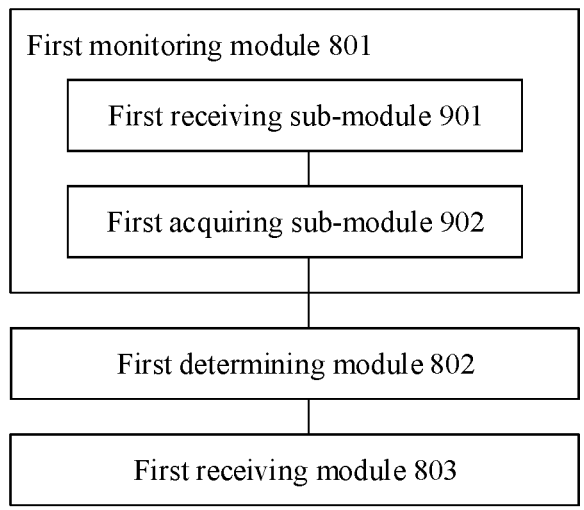
FIG. 9 is a block diagram of an apparatus for transmitting reference signal according to an exemplary embodiment.

In one embodiment, as shown in FIG. 9, the apparatus for transmitting reference signal shown in FIG. 8 may further include that the first monitoring module 801 is configured to include a first receiving sub-module 901 and a first acquiring sub-module 902.

The first receiving sub-module 901 is configured to receive a PDCCH message sent by the base station. The PDCCH message includes the dynamic scheduling information.

The first acquiring sub-module 902 is configured to acquire the dynamic scheduling information according to the PDCCH message.

In one embodiment, the PDCCH message further includes a target RNTI used for instructing the UE to receive the at least one reference symbol according to the scheduling information of the at least one reference symbol.

Figure 10:
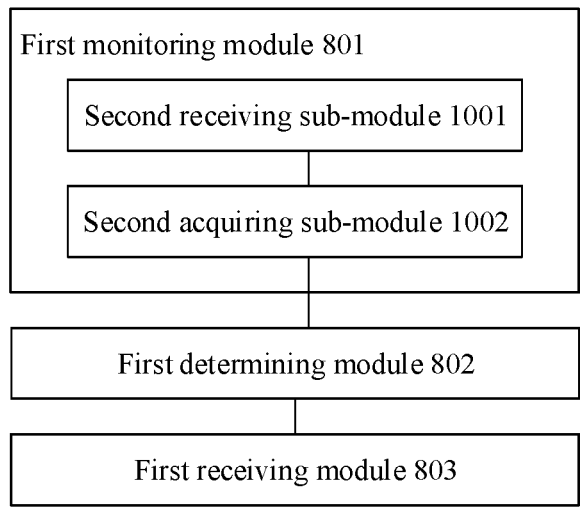
FIG. 10 is a block diagram of an apparatus for transmitting reference signal according to an exemplary embodiment.

In one embodiment, as shown in FIG. 10, the apparatus for transmitting reference signal shown in FIG. 8 may further include that the first monitoring module 801 is configured to include a second receiving sub-module 1001 and a second acquiring sub-module 1002.

The second receiving sub-module 1001 is configured to receive a MAC CE message sent by the base station. The MAC CE message includes the dynamic scheduling information.

The second acquiring sub-module 1002 is configured to acquire the dynamic scheduling information according to the MAC CE message.

In one embodiment, the dynamic scheduling information includes any one or any combination of the following information: a reference symbol type, time-frequency resource location information of reference symbol, a time-frequency resource mapping manner of reference symbol, and a reference symbol density.

In one embodiment, the reference symbol type includes any one or any combination of the following types: a DRS, a CSI-RS, a PSS, an SSS, and a PRS.

In one embodiment, different reference symbol types correspond to different RNTIs.

Figure 11:
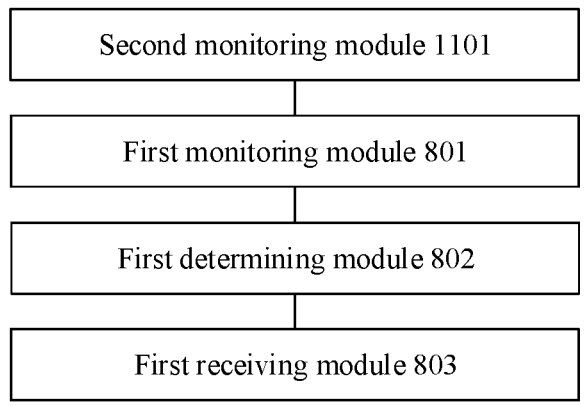
FIG. 11 is a block diagram of an apparatus for transmitting reference signal according to an exemplary embodiment.

In one embodiment, as shown in FIG. 11, the apparatus for transmitting reference signal shown in FIG. 8 may further include a second monitoring module 1101.

The second monitoring module 1101 is configured to monitor first configuration information sent by the base station. The first configuration information includes any one or any combination of the following information: a reference symbol type, time-frequency resource location information of reference symbol, a time-frequency resource mapping manner of reference symbol, and a reference symbol density. An information type included in the dynamic scheduling information is different from an information type included in the first configuration information.

The first determining module 802 is configured to determine the scheduling information of the at least one reference symbol according to the first configuration information and the dynamic scheduling information.

Figure 12:
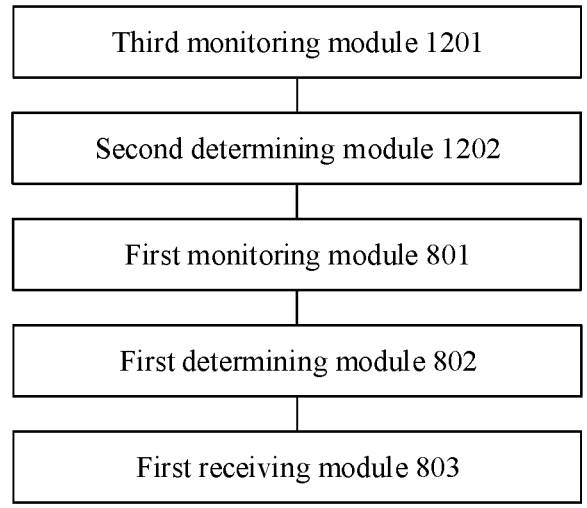
FIG. 12 is a block diagram of an apparatus for transmitting reference signal according to an exemplary embodiment.

In one embodiment, as shown in FIG. 12, the apparatus for transmitting reference signal shown in FIG. 8 may further include a third monitoring module 1201 and a second determining module 1202.

The third monitoring module 1201 is configured to monitor the indication information sent by the base station. The indication information is used for indicating whether the UE starts monitoring the dynamic scheduling information.

The second determining module 1202 is configured to determine whether to start monitoring the dynamic scheduling information according to the indication information.

Figure 13:
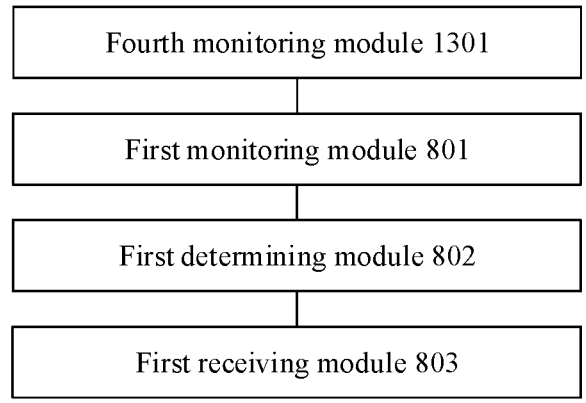
FIG. 13 is a block diagram of an apparatus for transmitting reference signal according to an exemplary embodiment.

In one embodiment, as shown in FIG. 13, the apparatus for transmitting reference signal shown in FIG. 8 may further include a fourth monitoring module 1301.

The fourth monitoring module 1301 is configured to monitor a second configuration information sent by the base station. The second configuration information including information of a monitoring window is used for instructing the UE to monitor the dynamic scheduling information in the monitoring window.

The first monitoring module 801 is configured to monitor the dynamic scheduling information in the monitoring window according to the second configuration information.

In one embodiment, the first monitoring module 801 monitors the dynamic scheduling information when a duration of no reference symbol being detected is greater than a preset duration or when consecutive times of no reference symbol being detected are greater than preset times.

Figure 14:
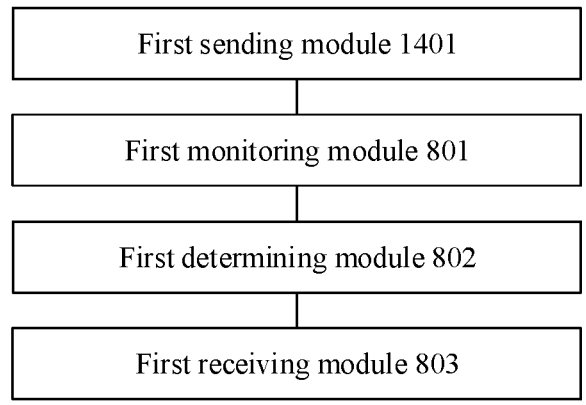
FIG. 14 is a block diagram of an apparatus for transmitting reference signal according to an exemplary embodiment.

In one embodiment, as shown in FIG. 14, the apparatus for transmitting reference signal shown in FIG. 8 may further include a first sending module.

The first sending module 1401 is configured to send capability information to the base station. The capability information is used for indicating whether the UE supports monitoring the dynamic scheduling information.

In one embodiment, the first monitor module 801 is configured to monitor the dynamic scheduling information sent by the base station at a paging moment.

Figure 15:
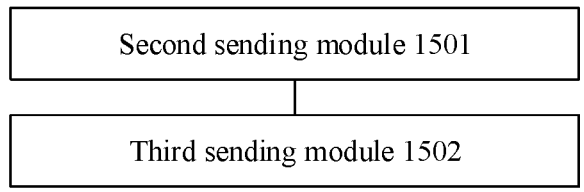
FIG. 15 is a block diagram of an apparatus for transmitting reference signal according to an exemplary embodiment.

FIG. 15 is a block diagram of an apparatus for transmitting reference signal according to an exemplary embodiment. The apparatus may be implemented in various ways, such as implementing all components of the apparatus in a base station, or implementing components in the apparatus in a coupled manner at the base station side. Referring to FIG. 15, the apparatus for transmitting reference signal includes a second sending module 1501 and a third sending module 1502.

The second sending module 1501 is configured to send dynamic scheduling information to a UE. The dynamic scheduling information includes scheduling information of at least one reference symbol.

The third sending module 1502 is configured to send the at least one reference symbol to the UE according to the scheduling information of the at least one reference symbol.

According to the technical solution provided in the embodiments of the present disclosure, the scheduling information of reference symbol is sent to a UE by a base station in real time, so that the UE can receive corresponding reference symbol in time according to an indication of the scheduling information of reference symbol, and then perform wireless measurement according to the reference symbol, thereby avoiding a problem in the prior art that a reference signal sent in a DMTC window cannot be sent due to LBT failure. The solution has high flexibility, and can increase an opportunity for the UE to perform wireless measurement, thereby improving wireless measurement efficiency.

In one embodiment, the second sending module 1501 is configured to send a PDCCH message to the UE. The PDCCH message includes the dynamic scheduling information.

In one embodiment, the PDCCH message further includes a target RNTI used for instructing the UE to receive the at least one reference symbol according to the scheduling information of the at least one reference symbol.

In one embodiment, the second sending module 1501 is configured to send a MAC CE message to the UE. The MAC CE message includes the dynamic scheduling information.

In one embodiment, the PDCCH message further includes PDSCH scheduling information.

In one embodiment, the dynamic scheduling information includes any one or any combination of the following information: a reference symbol type, time-frequency resource location information of reference symbol, a time-frequency resource mapping manner of reference symbol, and a reference symbol density:

In one embodiment, the reference symbol type includes any one or any combination of the following types: a DRS, a CSI-RS, a PSS, an SSS, and a PRS.

In one embodiment, different reference symbol types correspond to different RNTIs.

Figure 16:
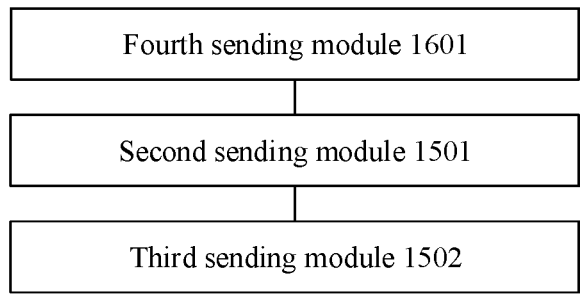
FIG. 16 is a block diagram of an apparatus for transmitting reference signal according to an exemplary embodiment.

In one embodiment, as shown in FIG. 16, the apparatus for transmitting reference signal shown in FIG. 15 may further include a fourth sending module.

The fourth sending module 1601 is configured to send first configuration information to the UE. The first configuration information includes any one or any combination of the following information: a reference symbol type, time-frequency resource location information of reference symbol, a time-frequency resource mapping manner of reference symbol, and a reference symbol density: An information type included in the dynamic scheduling information is different from an information type included in the first configuration information.

Figure 17:
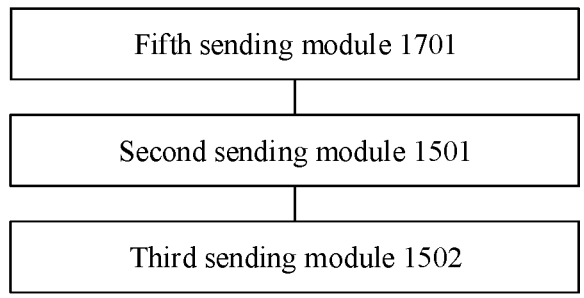
FIG. 17 is a block diagram of an apparatus for transmitting reference signal according to an exemplary embodiment.

In one embodiment, as shown in FIG. 17, the apparatus for transmitting reference signal shown in FIG. 15 may further include a fifth sending module 1701.

The fifth sending module 1701 is configured to send indication information to the UE. The indication information is used for indicating whether the UE starts monitoring the dynamic scheduling information.

Figure 18:
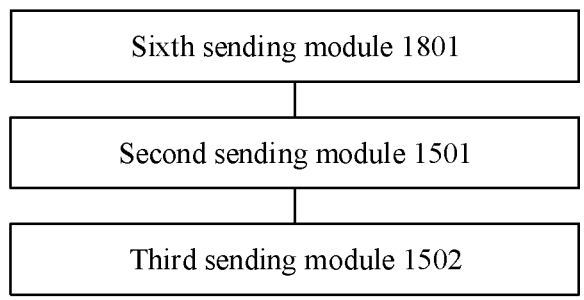
FIG. 18 is a block diagram of an apparatus for transmitting reference signal according to an exemplary embodiment.

In one embodiment, as shown in FIG. 18, the apparatus for transmitting reference signal shown in FIG. 15 may further include a sixth sending module 1801.

The sixth sending module 1801 is configured to send second configuration information to the UE. The second configuration information including information of a monitoring window is used for instructing the UE to monitor the dynamic scheduling information in the monitoring window.

The second sending module 1501 is configured to send dynamic scheduling information to the UE in the monitoring window.

In one embodiment, the second sending module 1501 is configured to send the dynamic scheduling information to the UE when a duration of sending reference symbol unsuccessfully is greater than a preset duration, or when consecutive times of sending reference symbol unsuccessfully are greater than preset times.

Figure 19:
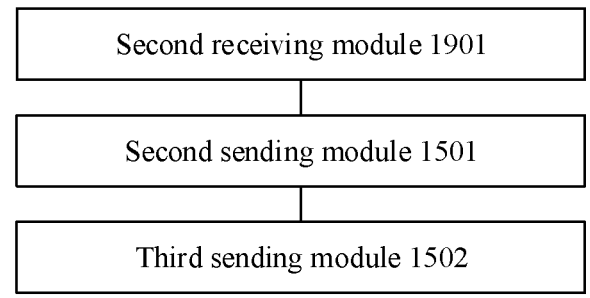
FIG. 19 is a block diagram of an apparatus for transmitting reference signal according to an exemplary embodiment.

In one embodiment, as shown in FIG. 19, the apparatus for transmitting reference signal shown in FIG. 15 may further include a second receiving module.

The second receiving module 1901 is configured to receive capability information sent by the UE. The capability information is used for indicating whether the UE supports monitoring the dynamic scheduling information.

The second sending module 1501 sends the dynamic scheduling information to the UE when learning, according to the capability information, that the UE supports monitoring the dynamic scheduling information.

In one embodiment, the second sending module 1501 is configured to send the dynamic scheduling information to the UE at a paging moment.

Figure 20:
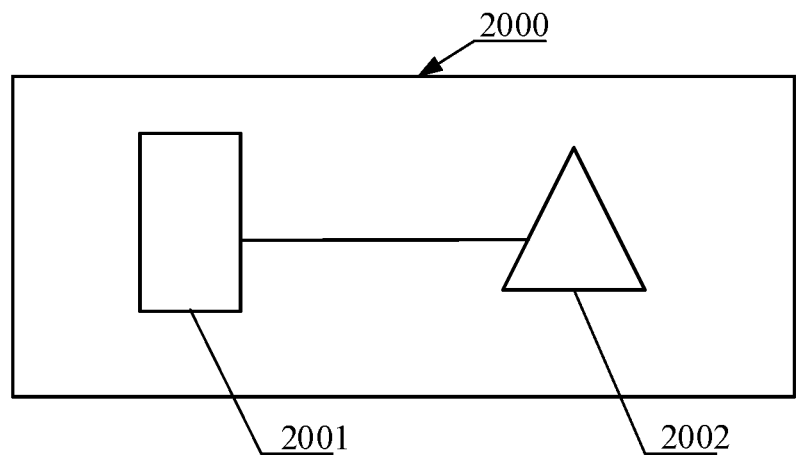
FIG. 20 is a block diagram of a device for transmitting reference signal according to an exemplary embodiment.

FIG. 20 is a block diagram of a device for transmitting reference signal 2000 according to an exemplary embodiment. The device is applied to a UE and the device for transmitting reference signal 2000 includes a processor and a memory for storing instructions executable for the processor 2002.

The processor 2001 is configured to perform the following operations.

Dynamic scheduling information sent by a base station is monitored. The dynamic scheduling information includes scheduling information of at least one reference symbol.

The scheduling information of the at least one reference symbol is determined according to the dynamic scheduling information.

The at least one reference symbol is received according to the scheduling information of the at least one reference symbol.

In one embodiment, the processor 2001 may also be configured to perform the following operation.

A PDCCH message sent by the base station is received. The PDCCH message includes the dynamic scheduling information.

The dynamic scheduling information is acquired according to the PDCCH message.

In one embodiment, the PDCCH message further includes a target RNTI used for instructing the UE to receive the at least one reference symbol according to the scheduling information of the at least one reference symbol.

In one embodiment, the processor 2001 may also be configured to perform the following operations.

A MAC CE message sent by a base station is received. The MAC CE message includes the dynamic scheduling information.

The dynamic scheduling information is acquired according to the MAC CE message.

In one embodiment, the dynamic scheduling information includes any one or any combination of the following information: a reference symbol type, time-frequency resource location information of reference symbol, and a time-frequency resource mapping manner of reference symbol.

In one embodiment, the reference symbol type includes any one or any combination of the following types: a DRS, a CSI-RS, a PSS, an SSS, and a PRS.

In one embodiment, different reference symbol types correspond to different RNTIs.

In one embodiment, the processor 2001 may be further configured to perform the following operation. First configuration information sent by the base station is monitored before monitoring the dynamic scheduling information sent by the base station. The first configuration information includes any one or any combination of the following information: a reference symbol type, time-frequency resource location information of reference symbol, a time-frequency resource mapping manner of reference symbol, and a reference symbol density. An information type included in the dynamic scheduling information is different from an information type included in the first configuration information.

The scheduling information of the at least one reference symbol is determined according to the first configuration information and the dynamic scheduling information.

In one embodiment, the processor 2001 may also be configured to perform the following operations.

The indication information sent by the base station is monitored before monitoring the dynamic scheduling information sent by the base station. The indication information is used for indicating whether the UE starts monitoring the dynamic scheduling information.

Whether to start monitoring the dynamic scheduling information is determined according to the indication information.

In one embodiment, the processor 2001 may also be configured to perform the following operations.

Second configuration information sent by the base station is monitored before monitoring the dynamic scheduling information sent by the base station. The second configuration information including information of a monitoring window is used for instructing the UE to monitor the dynamic scheduling information in the monitoring window.

The dynamic scheduling information is monitored in the monitoring window according to the second configuration information.

In one embodiment, the processor 2001 may also be configured to perform the following operation.

When a duration of no reference symbol being detected is greater than a preset duration or when consecutive times of no reference symbol being detected are greater than preset times, the dynamic scheduling information is monitored.

In one embodiment, the processor 2001 may be further configured to perform the following operation. Capability information is sent to the base station before monitoring the dynamic scheduling information sent by the base station. The capability information is used for indicating whether the UE supports monitoring the dynamic scheduling information.

In one embodiment, the processor 2001 may also be configured to perform the following operation. The dynamic scheduling information sent by the base station is monitored at a paging moment.

Figure 21:
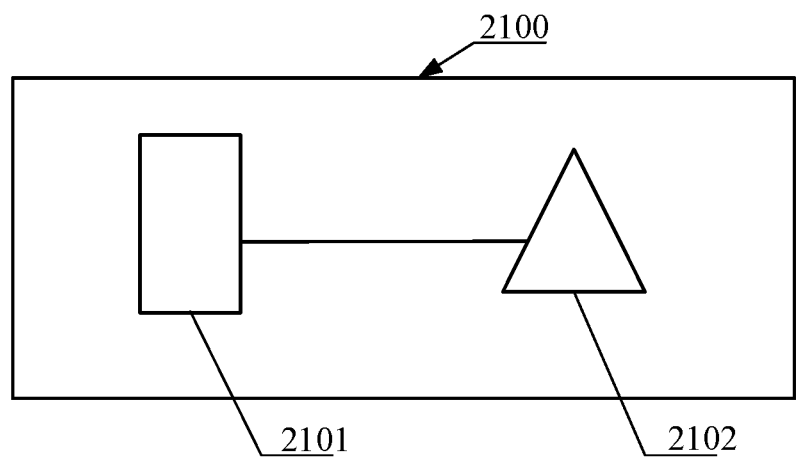
FIG. 21 is a block diagram of a device for transmitting reference signal according to an exemplary embodiment.

FIG. 21 is a block diagram of a device for transmitting reference signal 2100 according to an exemplary embodiment. The device is applied to a base station and the device for transmitting reference signal 2100 includes a processor 2101 and a memory for storing instructions executable for the processor 2102.

The processor 2101 is configured to perform the following operations.

Dynamic scheduling information is sent to a UE. The dynamic scheduling information includes scheduling information of at least one reference symbol.

The at least one reference symbol is sent to the UE according to the scheduling information of the at least one reference symbol.

In one embodiment, the processor 2101 may be further configured to perform the following operation. A PDCCH message is sent to the UE. The PDCCH message includes the dynamic scheduling information.

In one embodiment, the PDCCH message further includes a target RNTI used for instructing the UE to receive the at least one reference symbol according to the scheduling information of the at least one reference symbol.

In one embodiment, the processor 2101 may be further configured to perform the following operation. A MAC CE message is sent to the UE. The MAC CE message includes the dynamic scheduling information.

In one embodiment, the dynamic scheduling information includes any one or any combination of the following information: a reference symbol type, time-frequency resource location information of reference symbol, a time-frequency resource mapping manner of reference symbol, and a reference symbol density.

In one embodiment, the reference symbol type includes any one or any combination of the following types: a DRS, a CSI-RS, a PSS, an SSS, and a PRS.

In one embodiment, different reference symbol types correspond to different RNTIs.

In one embodiment, the processor 2101 may be further configured to perform the following operation. First configuration information is sent to the UE before sending the dynamic scheduling information to the UE. The first configuration information includes any one or any combination of the following information: a reference symbol type, time-frequency resource location information of reference symbol, a time-frequency resource mapping manner of reference symbol, and a reference symbol density. An information type included in the dynamic scheduling information is different from an information type included in the first configuration information.

In one embodiment, the processor 2101 may be further configured to perform the following operation. Indication information is sent to the UE before sending the dynamic scheduling information to the UE. The indication information is used for indicating whether the UE starts monitoring the dynamic scheduling information.

In one embodiment, the processor 2101 may be further configured to perform the following operations. The second configuration information is sent to the UE before sending the dynamic scheduling information to the UE. The second configuration information including information of a monitoring window is used to instructing the UE to monitor the dynamic scheduling information in the monitoring window.

The dynamic scheduling information is sent to the UE in the monitoring window:

In one embodiment, the processor 2101 may also be configured to perform the following operation.

When a duration of sending reference symbol unsuccessfully is greater than a preset duration, or when consecutive times of sending reference symbol unsuccessfully are greater than the preset times, the dynamic scheduling information is sent to the UE.

In one embodiment, the processor 2101 may be further configured to perform the following operations. Capability information sent by the UE is received before sending the dynamic scheduling information to the UE. The capability information is used for indicating whether the UE supports monitoring the dynamic scheduling information.

When learning, according to the capability information, that the UE supports monitoring the dynamic scheduling information, the dynamic scheduling information is sent to the UE.

In one embodiment, the processor 2101 may also be configured to send the dynamic scheduling information to the UE at a paging moment.

With respect to the apparatus in the above embodiments, the specific manner in which the various modules perform operations has been described in detail in the embodiments relating to the method, and will not be described in detail herein.

Figure 22:
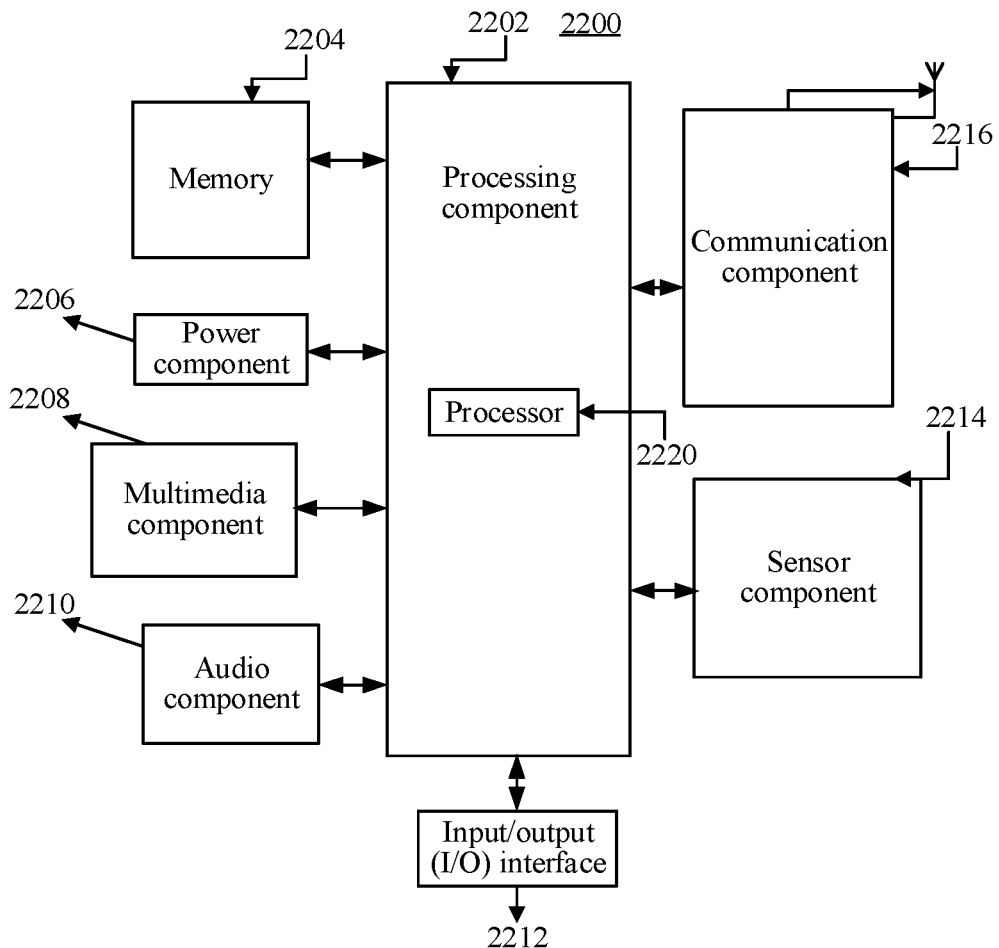
FIG. 22 is a block diagram of a device for transmitting reference signal according to an exemplary embodiment.

FIG. 22 is a block diagram of a device for transmitting reference signal according to an exemplary embodiment. The device for transmitting reference signal 2200 is applied to the UE. The device for transmitting reference signal 2200 may include one or more of the following components: a processing component 2202, a memory 2204, a power component 2206, a multimedia component 2208, an audio component 2210, an input/output (I/O) interface 2212, a sensor component 2214, and a communication component 2216.

The processing component 2202 generally controls the overall operation of the device for transmitting reference signal 2200, such as an operation associated with a display, a telephone call, a data communication, a camera operation, and a recording operation. The processing component 2202 may include one or more processors 2220 to execute instructions to perform all or a portion of the steps of the method described above. In addition, the processing component 2202 may include one or more modules to facilitate interaction between the processing component 2202 and other components. For example, the processing component 2202 may include a multimedia module to facilitate interaction between the multimedia component 2208 and the processing component 2202.

The memory 2204 is configured to store various types of data to support operation at the device for transmitting reference signal 2200. Examples of such data include instructions for any application or method operating on the device for transmitting reference signal 2200, contact data, phone book data, messages, pictures, video, etc. The memory 2204 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 2206 supplies power to various components of the device for transmitting reference signal 2200. The power supply component 2206 may include a power management system, one or more power supplies, and other components associated with generating, managing, and distributing power for the device for transmitting reference signal 2200.

The multimedia component 2208 includes a screen providing an output interface between the device for transmitting reference signal 2200 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, slide, and gestures on the touch panel. The touch sensor may not only sense the boundary of the touch or sliding action, but also detect the duration and pressure associated with the touch or sliding operation. In some embodiments, the multimedia component 2208 includes a front-facing camera and/or a rear-facing camera. When the device for transmitting reference signal 2200 is in an operation mode, such as a shooting mode or a video mode, the front-facing camera and/or the rear-facing camera may receive external multimedia data. Each of the front-facing camera and the rear-facing camera may be a fixed optical lens system or have a focal length and optical zoom capability.

The audio component 2210 is configured to output and/or input audio signals. For example, the audio component 2210 includes a microphone (MIC). The MIC is configured to receive an external audio signal when the device for transmitting reference signal 2200 is in an operation mode such as a call mode, a recording mode, and a speech recognition mode. The received audio signal may be further stored in memory 2204 or sent via communication component 2216. In some embodiments, the audio component 2210 further includes a speaker used for outputting an audio signal.

The I/O interface 2212 provides an interface between the processing component 2202 and the peripheral interface module, which may be a keyboard, a click wheel, a button, or the like. These buttons may include, but are not limited to, a home page button, a volume button, an activation button, and a lock button.

The sensor component 2214 includes one or more sensors used for providing state evaluation of various aspects for the device for transmitting reference signal 2200. For example, the sensor component 2214 may detect the on/off state of the device of transmitting reference signal 2200, the relative positioning of the components, such as the display and keypad of the device for transmitting reference signal 2200, the sensor component 2214 may also detect a change in the position of the device for transmitting reference signal or one component of the device for transmitting reference signal 2200, the presence or absence of user contact with the device for transmitting reference signal 2200, the orientation or acceleration/deceleration of the device for transmitting reference signal 2200, and the temperature change of the device for transmitting reference signal 2200. The sensor component 2214 may include a proximity sensor configured to detect the presence of a nearby object in the absence of any physical contact. The sensor component 2214 may also include a light sensor, such as a CMOS or CCD picture sensor, for use in imaging applications. In some embodiments, the sensor component 2214 may also include an acceleration sensor, a gyroscope sensor, a magnetic sensor, a pressure sensor, or a temperature sensor.

The communication component 2216 is configured to facilitate wired or wireless communication between the device for transmitting reference signal 2200 and other devices. The device for transmitting reference signal 2200 may access a wireless network based on a communication standard, such as WiFi, 2G/3G/4G/5G, or a combination thereof. In one exemplary embodiment, communication component 2216 receives broadcast signals or broadcast-related information from an external broadcast management system via a broadcast channel. In one exemplary embodiment, communication component 2216 further includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology, and other technologies.

In an exemplary embodiment, the device for transmitting reference signal 2200 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the methods described above.

In an exemplary embodiment, a non-transitory computer readable storage medium including instructions, such as a memory 2204 including instructions is also provided. The above instructions may be executed by the processor 2220 of the device for transmitting reference signal 2200 to perform the above method. For example, the non-transitory computer readable storage medium may be a ROM, a random access memory (RAM), a CD-ROM, a magnetic tape, a floppy disk, an optical data storage device, or the like.

When the instructions in the storage medium are executed by the processor, the device for transmitting reference signal 2200 is enabled to perform the following method and the method includes the following operations.

Dynamic scheduling information sent by a base station is monitored. The dynamic scheduling information includes scheduling information of at least one reference symbol.

The scheduling information of the at least one reference symbol is determined according to the dynamic scheduling information.

The at least one reference symbol is received according to the scheduling information of the at least one reference symbol.

In one embodiment, the operation that the dynamic scheduling information sent by the base station is monitored includes the following operation.

A PDCCH message sent by the base station is received. The PDCCH message includes the dynamic scheduling information.

The dynamic scheduling information is acquired according to the PDCCH message.

In one embodiment, the PDCCH message further includes a target RNTI used for instructing the UE to receive the at least one reference symbol according to the scheduling information of the at least one reference symbol.

In one embodiment, the operation that the dynamic scheduling information sent by the base station is monitored includes the following operations.

A MAC CE message sent by the base station is received. The MAC CE message includes the dynamic scheduling information.

The dynamic scheduling information is acquired according to the MAC CE message.

In one embodiment, the dynamic scheduling information includes any one or any combination of the following information: a reference symbol type, time-frequency resource location information of reference symbol, a time-frequency resource mapping manner of reference symbol, and a reference symbol density.

In one embodiment, the reference symbol type includes any one or any combination of the following types: a DRS, a CSI-RS, a PSS, a SSS, and a PRS.

In one embodiment, different reference symbol types correspond to different RNTIs.

In one embodiment, before monitoring the dynamic scheduling information sent by the base station, the method further includes the following operation.

First configuration information sent by the base station is monitored. The first configuration information includes any one or any combination of the following information: a reference symbol type, time-frequency resource location information of the reference symbol, a time-frequency resource mapping manner of a reference symbol, and a reference symbol density. An information type included in the dynamic scheduling information is different from an information type included in the first configuration information.

The operation that the scheduling information of the at least one reference symbol is determined according to the dynamic scheduling information includes the following operation.

The scheduling information of the at least one reference symbol is determined according to the first configuration information and the dynamic scheduling information.

In one embodiment, before monitoring the dynamic scheduling information sent by the base station, the method further includes the following operations.

The indication information sent by the base station is monitored. The indication information is used for indicating whether the UE starts monitoring the dynamic scheduling information.

Whether to start monitoring the dynamic scheduling information is determined according to the indication information.

In one embodiment, before monitoring the dynamic scheduling information sent by the base station, the method further includes the following operation.

Second configuration information sent by the base station is monitored. The second configuration information including information of a monitoring window is used to instructing the UE to monitor the dynamic scheduling information in the monitoring window:

The operation that the dynamic scheduling information sent by the base station is monitored includes the following operation.

The dynamic scheduling information is monitored in the monitoring window according to the second configuration information.

In one embodiment, the dynamic scheduling information sent by the base station is monitored includes the following operation.

When a duration of no reference symbol being detected is greater than a preset duration or when consecutive times of no reference symbol being detected are greater than preset times, the dynamic scheduling information is monitored.

In one embodiment, before monitoring the dynamic scheduling information sent by the base station, the method further includes the following operation.

Capability information is sent to the base station. The capability information is used for indicating whether the UE supports monitoring the dynamic scheduling information.

In one embodiment, monitoring the dynamic scheduling information sent by the base station includes the following operation.

The dynamic scheduling information sent by the base station is monitored at a paging moment.

Figure 23:
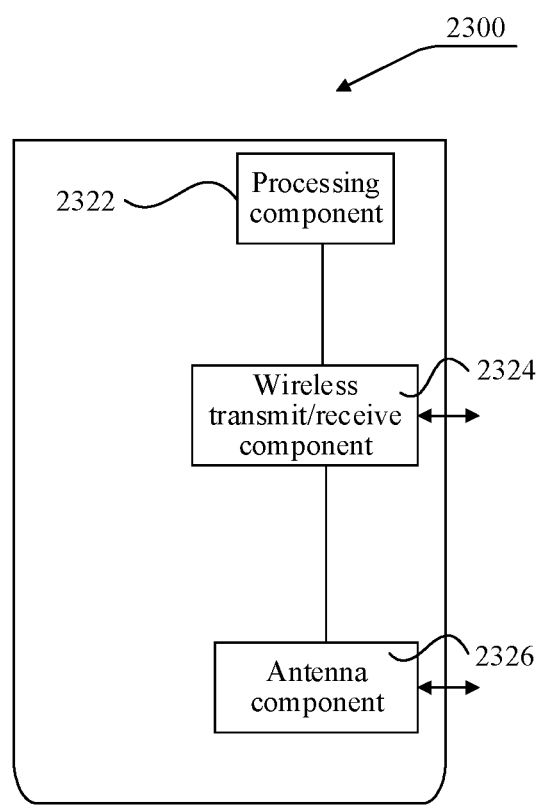
FIG. 23 is a block diagram of a device for transmitting reference signal according to an exemplary embodiment.

FIG. 23 is a block diagram of a device for transmitting reference signal according to an exemplary embodiment. As shown in FIG. 23, the device for transmitting reference signal 2300 may be provided as a base station. Referring to FIG. 23, the device for transmitting reference signal 2300 includes a processing component 2322, a wireless transmit/receive component 2324, an antenna component 2326, and a signal processing portion specific to a wireless interface, and the processing component 2322 may further include one or more processors.

One of the processors in the processing component 2322 may be configured to perform the following method and the method includes the following operations.

Dynamic scheduling information is sent to a UE. The dynamic scheduling information includes scheduling information of at least one reference symbol.

The at least one reference symbol is sent to the UE according to the scheduling information of the at least one reference symbol.

In one embodiment, the operation that the dynamic scheduling information is sent to the UE includes the following operation.

A PDCCH message is sent to the UE. The PDCCH message includes the dynamic scheduling information.

In one embodiment, the PDCCH message further includes: a target RNTI used for instructing the UE to receive the at least one reference symbol according to the scheduling information of the at least one reference symbol.

In one embodiment, the operation that the dynamic scheduling information is sent to the UE includes the following operation.

A MAC CE message is sent to the UE. The MAC CE message includes the dynamic scheduling information.

In one embodiment, the dynamic scheduling information includes any one or any combination of the following information: a reference symbol type, time-frequency resource location information of reference symbol, time-frequency resource mapping manner of reference symbol, and a reference symbol density.

In one embodiment, the reference symbol type includes any one or any combination of the following types: a DRS, a CSI-RS, a PSS, a SSS, and a PRS.

In one embodiment, different reference symbol types correspond to different RNTIs.

In one embodiment, before sending the dynamic scheduling information to the UE, the method further includes the following operation.

First configuration information is sent to the UE. The first configuration information includes any one or any combination of the following information: a reference symbol type, time-frequency resource location information of reference symbol, a time-frequency resource mapping manner of reference symbol, and a reference symbol density: An information type included in the dynamic scheduling information is different from an information type included in the first configuration information.

In one embodiment, before sending the dynamic scheduling information to the UE, the method further includes the following operation.

Indication information is sent to the UE. The indication information is used for indicating whether the UE starts monitoring the dynamic scheduling information.

In one embodiment, before sending the dynamic scheduling information to the UE, the method further includes the following operation.

Second configuration information is sent to the UE. The second configuration information including information of a monitoring window is used for instructing the UE to monitor the dynamic scheduling information in the monitoring window.

The operation that the dynamic scheduling information is sent to the UE includes the following operation.

The dynamic scheduling information is sent to the UE in the monitoring window:

In one embodiment, the operation that the dynamic scheduling information is sent to the UE includes the following operation.

When a duration of sending reference symbol unsuccessfully is greater than a preset duration, or when consecutive times of sending reference symbol unsuccessfully are greater than the preset times, the dynamic scheduling information is sent to the UE.

In one embodiment, before sending the dynamic scheduling information to the UE, the method further includes the following operation.

Capability information sent by the UE is received. The capability information is used for indicating whether the UE supports monitoring the dynamic scheduling information.

The operation that the dynamic scheduling information is sent to the UE includes the following operation.

When learning, according to the capability information, that the UE supports monitoring the dynamic scheduling information, the dynamic scheduling information is sent to the UE.

In one embodiment, the operation that the dynamic scheduling information is sent to the UE includes the following operation.

The dynamic scheduling information is sent to the UE at a paging moment.

The technical solution provided in the embodiments of the present disclosure may include the following advantageous effects. In the technical solution, the scheduling information of reference symbol is sent to the UE by a base station in real time, so that the UE can receive corresponding reference symbol in time according to an indication of the scheduling information of the reference symbol, and then perform wireless measurement according to the reference symbol, thereby avoiding a problem in the prior art that the reference signal sent in an DMTC window cannot be sent due to LBT failure. The solution has high flexibility, and can increase an opportunity for the UE to perform wireless measurement, thereby improving wireless measurement efficiency.

Other embodiments of the present disclosure are obvious to those skilled in the art upon consideration of the specification and practice of the disclosure herein. The present disclosure is intended to cover any variations, uses or adaptations of the present disclosure that follow the general principles of the present disclosure and include common general knowledge or customary technical means in the art not disclosed herein. The specification and examples are to be regarded as exemplary only, and the true scope and spirit of the present disclosure are pointed out by the following claims.

It should be understood that the invention is not limited to the precise construction already described above and illustrated in the accompanying drawings, and that various modifications and changes may be made without departing from the scope thereof. The scope of the invention is limited only by the appended claims.

The invention claimed is:

1. A method for transmitting reference signal, comprising:
    monitoring, by a user equipment (UE), dynamic scheduling information sent by a base station, wherein the dynamic scheduling information comprises scheduling information of at least one reference symbol;
    determining, by the UE, the scheduling information of the at least one reference symbol according to the dynamic scheduling information; and receiving, by the UE, the at least one reference symbol according to the scheduling information of the at least one reference symbol, wherein monitoring the dynamic scheduling information sent by the base station comprises:

in response to determining that a duration of no reference symbol detected is greater than a preset duration or in response to determining that consecutive times of no reference symbol detected are greater than preset times, monitoring the dynamic scheduling information.

2. The method of claim 1, wherein monitoring the dynamic scheduling information sent by the base station comprises:

receiving a physical Downlink Control Channel (PDCCH) message sent by the base station, wherein the PDCCH message comprises the dynamic scheduling information; and acquiring the dynamic scheduling information according to the PDCCH message.

3. The method of claim 2, wherein the PDCCH message further comprises:

a target Radio Network Temporary Identifier (RNTI) used for instructing the UE to receive the at least one reference symbol according to the scheduling information of the at least one reference symbol.

4. The method of claim 1, wherein monitoring the dynamic scheduling information sent by the base station comprises:

receiving a Media Access Control (MAC) Control Element (CE) message sent by the base station, wherein the MAC CE message comprises the dynamic scheduling information; and acquiring the dynamic scheduling information according to the MAC CE message.

5. The method of claim 1, wherein the dynamic scheduling information comprises at least one of following parameters:

a reference symbol type, time-frequency resource location information of reference symbol, a time-frequency resource mapping manner of reference symbol, or a reference symbol density.

6. The method of claim 5, wherein different reference symbol types correspond to different Radio Network Temporary Identifiers (RNTIs).

7. The method of claim 1, further comprising:

monitoring first configuration information sent by the base station, wherein the first configuration information comprises at least one of following parameters: a reference symbol type, time-frequency resource location information of reference symbol, a time-frequency resource mapping manner of reference symbol, or a reference symbol density, wherein an information type comprised in the dynamic scheduling information is different from an information type comprised in the first configuration information, wherein determining the scheduling information of the at least one reference symbol according to the dynamic scheduling information comprises:

determining the scheduling information of the at least one reference symbol according to the first configuration information and the dynamic scheduling information.

8. The method of claim 1, further comprising:

monitoring indication information sent by the base station, wherein the indication information is used for indicating whether the UE starts monitoring the dynamic scheduling information; and determining whether to start monitoring the dynamic scheduling information according to the indication information.

9. The method of claim 1, further comprising:

monitoring second configuration information sent by the base station, wherein the second configuration information comprises information of a monitoring window used for instructing the UE to monitor the dynamic scheduling information in the monitoring window, wherein monitoring the dynamic scheduling information sent by the base station comprises:

monitoring the dynamic scheduling information in the monitoring window according to the second configuration information.

10. The method of claim 1, further comprising:

sending capability information to the base station, wherein the capability information is used for indicating whether the UE supports monitoring the dynamic scheduling information.

11. The method of claim 1, wherein monitoring the dynamic scheduling information sent by the base station comprises:

monitoring the dynamic scheduling information sent by the base station at a paging moment.

12. A method for transmitting reference signal, comprising:

sending, by a base station, dynamic scheduling information to a user equipment (UE), wherein the dynamic scheduling information comprises scheduling information of at least one reference symbol; and sending, by the base station, the at least one reference symbol to the UE according to the scheduling information of the at least one reference symbol, wherein sending the dynamic scheduling information to the UE comprises:

in response to determining that a duration of sending reference symbol unsuccessfully is greater than a preset duration, or in response to determining that consecutive times of sending reference symbol unsuccessfully are greater than the preset times, sending the dynamic scheduling information to the UE.

13. The method of claim 12, wherein sending the dynamic scheduling information to the UE comprises:

sending a physical Downlink Control Channel (PDCCH) message to the UE, wherein the PDCCH message comprises the dynamic scheduling information.

14. The method of claim 13, wherein the PDCCH message further comprises:

a target Radio Network Temporary Identifier (RNTI) used for instructing the UE to receive the at least one reference symbol according to the scheduling information of the at least one reference symbol.

15. The method of claim 12, wherein sending the dynamic scheduling information to the UE comprises:

sending a Medium Access Control (MAC) Control Element (CE) message to the UE, wherein the MAC CE message comprises the dynamic scheduling information.

16. The method of claim 12, wherein the dynamic scheduling information comprises at least one of following parameters:

a reference symbol type, time-frequency resource location information of reference symbol, a time-frequency resource mapping manner of reference symbol, or a reference symbol density.

17. The method of claim 16, wherein different reference symbol types correspond to different Radio Network Temporary Identifiers (RNTIs).

18. The method of claim 12, further comprising:
sending first configuration information to the UE, wherein the first configuration information comprises at least one of following parameters: a reference symbol type, time-frequency resource location information of reference symbol, a time-frequency resource mapping manner of reference symbol, or a reference symbol density, wherein an information type comprised in the dynamic scheduling information is different from an information type comprised in the first configuration information.

19. The method of claim 12, further comprising:
sending indication information to the UE, wherein the indication information is used for indicating whether the UE starts monitoring the dynamic scheduling information.

20. The method of claim 12, further comprises:
sending second configuration information to the UE, wherein the second configuration information comprises information of a monitoring window used for instructing the UE to monitor the dynamic scheduling information in the monitoring window,
wherein sending the dynamic scheduling information to the UE comprises:
sending the dynamic scheduling information to the UE in the monitoring window.

21. The method of claim 12, further comprising:
receiving capability information sent by the UE, wherein the capability information is used for indicating whether the UE supports monitoring the dynamic scheduling information,
wherein sending the dynamic scheduling information to the UE comprises:
in response to learning, according to the capability information, that the UE supports monitoring the dynamic scheduling information, sending the dynamic scheduling information to the UE.

22. The method of claim 12, wherein sending the dynamic scheduling information to the UE comprises:
sending the dynamic scheduling information to the UE at a paging moment.

23. A non-transitory computer readable storage medium on which at least one instruction is stored, wherein the at least one instruction is loaded and executed by at least one processor to perform the operations comprising:
monitoring dynamic scheduling information sent by a base station, wherein the dynamic scheduling information comprises scheduling information of at least one reference symbol;
determining the scheduling information of the at least one reference symbol according to the dynamic scheduling information; and
receiving the at least one reference symbol according to the scheduling information of the at least one reference symbol,
wherein monitoring the dynamic scheduling information sent by the base station comprises:
in response to determining that a duration of no reference symbol detected is greater than a preset duration or in response to determining that consecutive times of no reference symbol detected are greater than preset times, monitoring the dynamic scheduling information.

24. A non-transitory computer readable storage medium, on which at least one instruction is stored, wherein the at least one instruction is loaded and executed by at least one processor to perform the operations comprising:
sending dynamic scheduling information to a user equipment (UE), wherein the dynamic scheduling information comprises scheduling information of at least one reference symbol; and
sending the at least one reference symbol to the UE according to the scheduling information of the at least one reference symbol,
wherein sending the dynamic scheduling information to the UE comprises:
in response to determining that a duration of sending reference symbol unsuccessfully is greater than a preset duration, or in response to determining that consecutive times of sending reference symbol unsuccessfully are greater than the preset times, sending the dynamic scheduling information to the UE.

* * * * *